US00RE49628E

(19) United States
(12) Reissued Patent
Derus

(10) Patent Number: US RE49,628 E
(45) Date of Reissued Patent: Aug. 29, 2023

(54) ARCHERY BOW ASSEMBLY

(71) Applicant: TOG-IP LLC, West Henrietta, NY (US)

(72) Inventor: Michael W. Derus, Victor, NY (US)

(73) Assignee: TOG-IP LLC, West Henrietta, NY (US)

(21) Appl. No.: 17/031,529

(22) Filed: Sep. 24, 2020

Related U.S. Patent Documents

Reissue of:
(64) Patent No.: 10,082,357
Issued: Sep. 25, 2018
Appl. No.: 15/426,713
Filed: Feb. 7, 2017

U.S. Applications:
(63) Continuation of application No. 15/163,291, filed on May 24, 2016, now Pat. No. 9,599,424, which is a continuation of application No. 14/492,396, filed on Sep. 22, 2014, now Pat. No. 9,377,266.

(60) Provisional application No. 61/880,303, filed on Sep. 20, 2013.

(51) Int. Cl.
*F41B 5/00* (2006.01)
*F41B 5/10* (2006.01)
*F41B 5/14* (2006.01)

(52) U.S. Cl.
CPC ..... *F41B 5/0031* (2013.01); *F41B 5/10* (2013.01); *F41B 5/14* (2013.01); *F41B 5/143* (2013.01)

(58) Field of Classification Search
CPC ..... F41B 5/0031; F41B 5/10; F41B 5/143
See application file for complete search history.

(56) References Cited

U.S. PATENT DOCUMENTS

| | | | | |
|---|---|---|---|---|
| 1,689,141 | A | 10/1928 | Keller | |
| 1,847,593 | A | 3/1932 | James | |
| 2,186,386 | A * | 1/1940 | Lowell | F41B 5/143 124/24.1 |
| 2,909,167 | A | 10/1959 | Fredrickson | F41G 1/467 124/25.7 |
| 3,055,353 | A | 9/1962 | Perrucci | |
| 3,923,036 | A | 12/1975 | Jennings et al. | |
| 4,257,385 | A * | 3/1981 | Stewart | F41G 1/467 124/24.1 |
| 4,343,286 | A | 8/1982 | Thacker | |
| 4,458,657 | A | 7/1984 | Stockmar | |
| 4,759,337 | A * | 7/1988 | Suski | F41B 5/14 124/24.1 |
| 4,971,020 | A | 11/1990 | Soderstrom et al. | |
| 5,099,819 | A * | 3/1992 | Simonds | F41B 5/10 124/23.1 |
| 5,243,958 | A * | 9/1993 | Shepley, Jr. | F41B 5/0031 124/23.1 |
| 5,649,519 | A | 7/1997 | Linderman | |
| 5,682,871 | A * | 11/1997 | Walk | F41B 5/10 124/24.1 |
| 6,019,097 | A | 2/2000 | Cox et al. | |
| 6,142,133 | A | 11/2000 | Anderson | |

(Continued)

*Primary Examiner* — Jeffrey R Jastrzab
(74) *Attorney, Agent, or Firm* — Barclay Damon LLP

(57) ABSTRACT

An archery bow riser for an archery bow is disclosed. The archery riser, in an embodiment, includes a first section, a frame connected to the first section and a second section connected to the frame. The frame defines a cavity or inner space, and the frame is configured to reduce deformation of at least part of the archery bow riser.

24 Claims, 8 Drawing Sheets

AMENDED

(56) References Cited

U.S. PATENT DOCUMENTS 6,758,204 B1 * 7/2004 Goff ..... F41B 5/10 124/25.6
7,066,165 B2 * 6/2006 Perry ..... F41B 5/005 124/23.1
7,258,113 B2 8/2007 Pilpel et al.
7,373,934 B2 * 5/2008 Smith ..... F41B 5/10 124/25.6
8,079,353 B2 * 12/2011 Davis ..... F41B 5/0026 124/23.1
8,522,762 B2 9/2013 Trpkovski
8,622,050 B2 1/2014 Goff et al. ..... F41B 5/12 124/25
8,627,810 B2 1/2014 McPherson
8,807,125 B1 8/2014 Mathur et al.
8,844,510 B2 * 9/2014 Liu ..... F41B 5/10 124/23.1
9,140,513 B2 * 9/2015 Trpkovski ..... F41B 5/1426
2007/0084451 A1 * 4/2007 Perry ..... F41B 5/14 124/23.1
2007/0101980 A1 * 5/2007 Sims ..... F41B 5/10 124/25.6
2010/0000504 A1 * 1/2010 Trpkovski ..... F41B 5/0094 124/25.6
2014/0261354 A1 * 9/2014 Ross, Jr. ..... F41B 5/143 124/23.1
2014/0360478 A1 * 12/2014 Ady ..... F41B 5/1403 124/23.1
2014/0366858 A1 * 12/2014 Garver ..... F41B 5/1403 124/25.6
2015/0153131 A1 6/2015 Trpkovski
2016/0025443 A1 * 1/2016 Valsecchi ..... F41B 5/0026 124/23.1
2016/0102937 A1 * 4/2016 Eli ..... F41B 5/1403 124/25.6

* cited by examiner

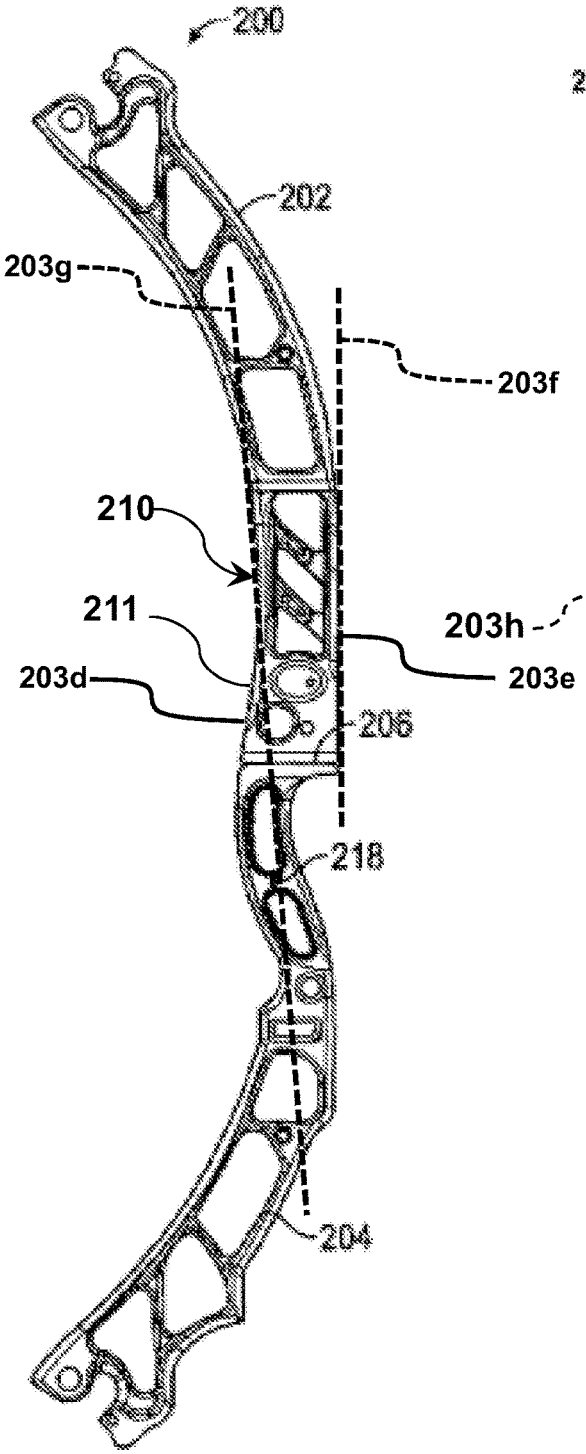
FIG. 2A
AMENDED
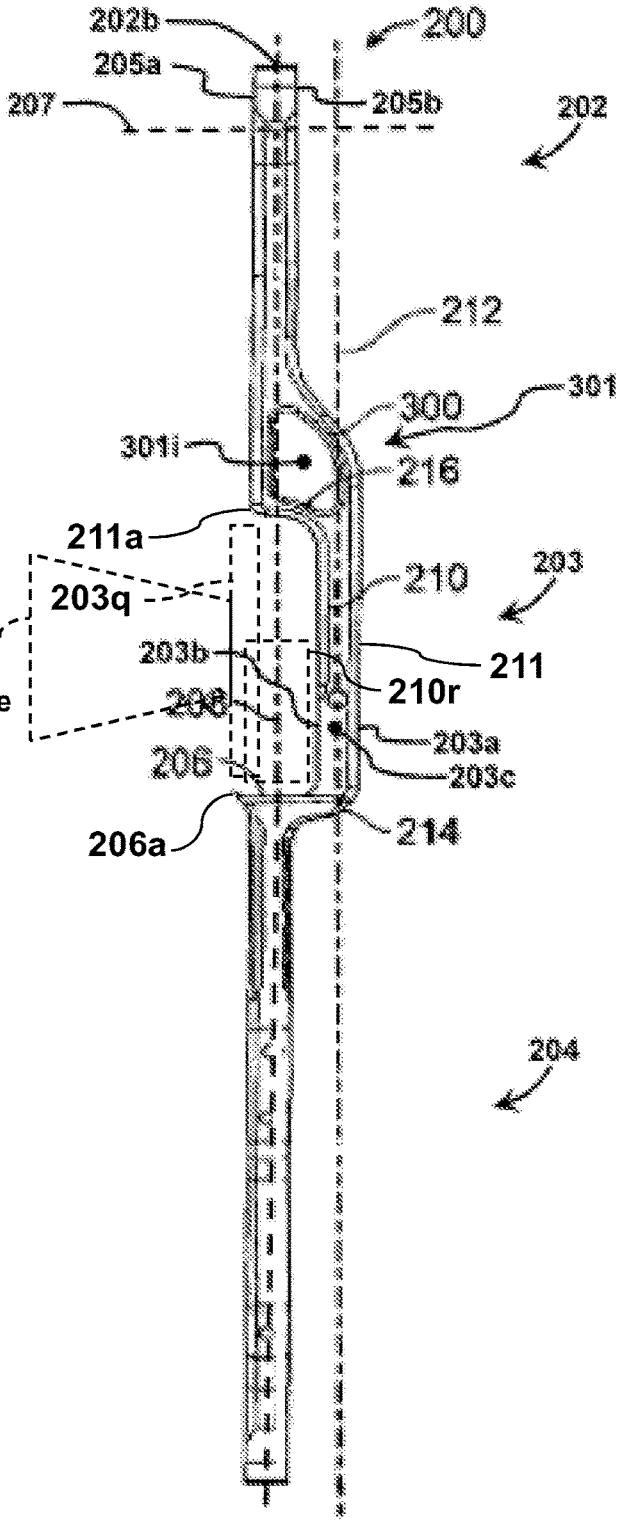
FIG. 2B
AMENDED

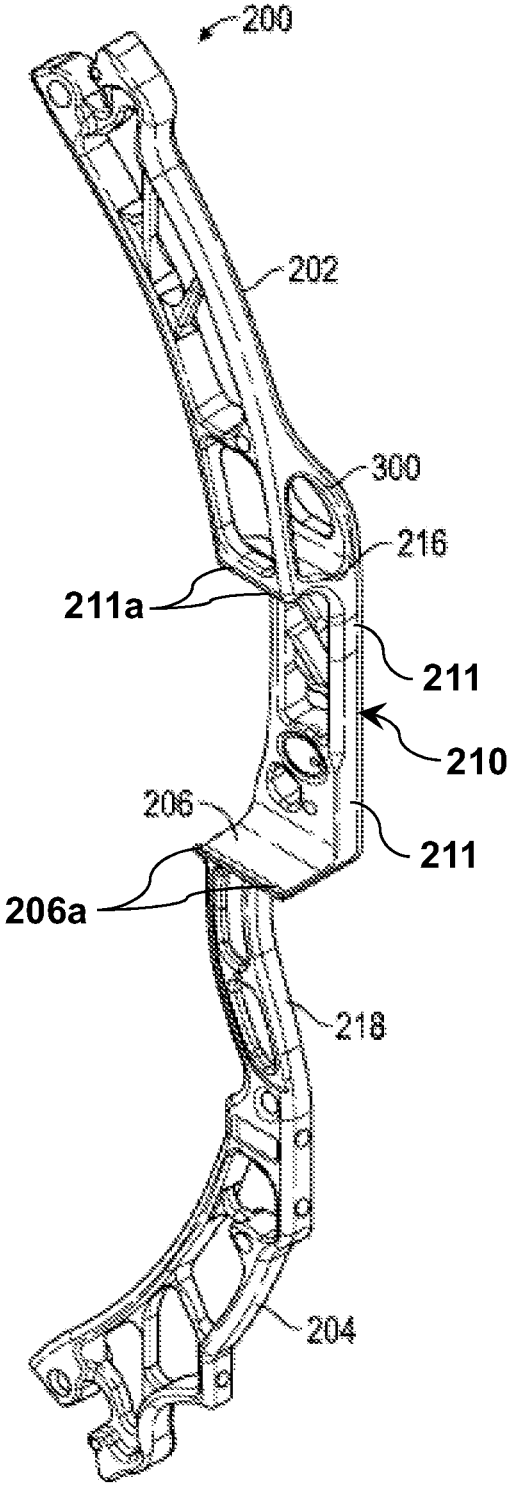
FIG. 2C
AMENDED

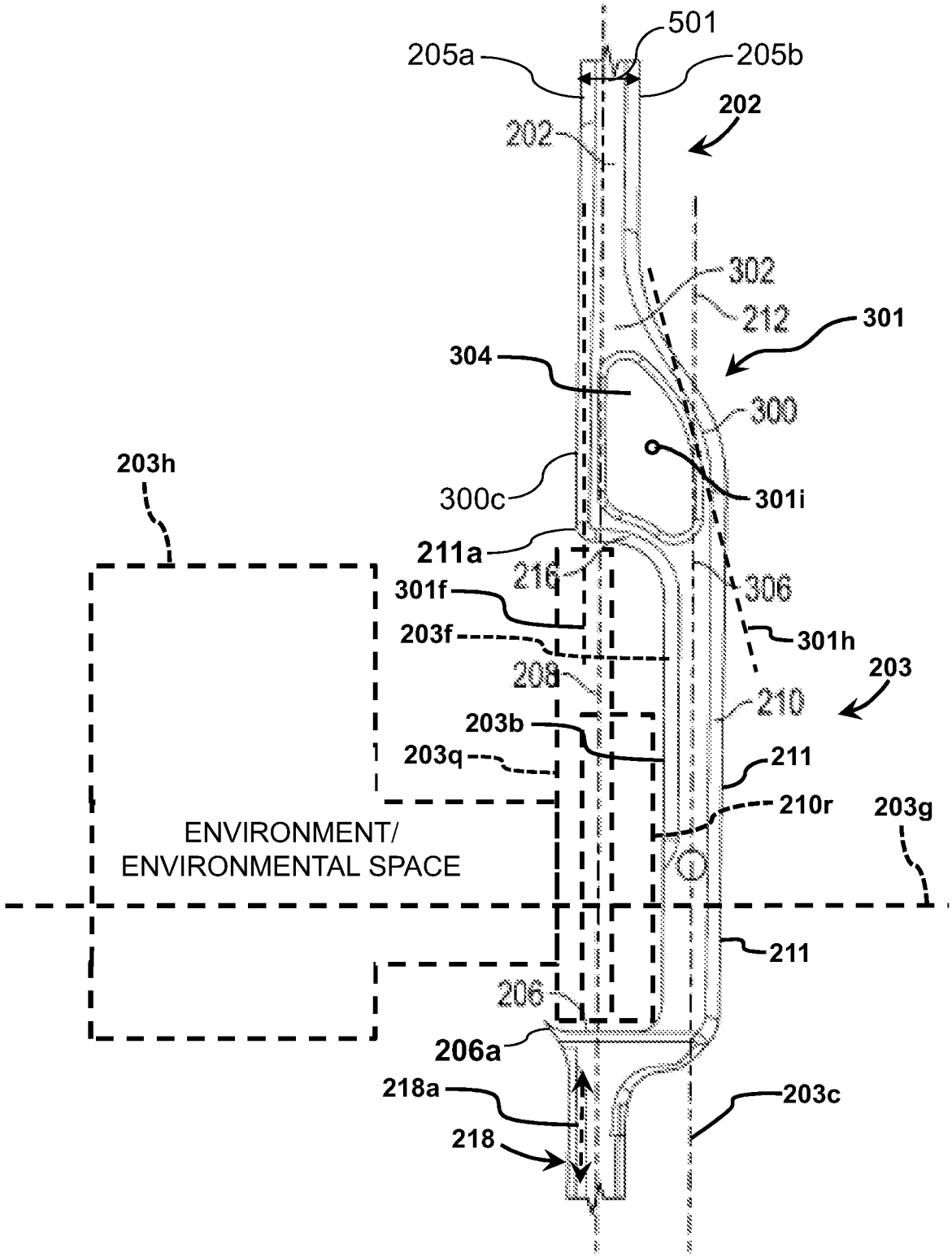
FIG. 3
AMENDED

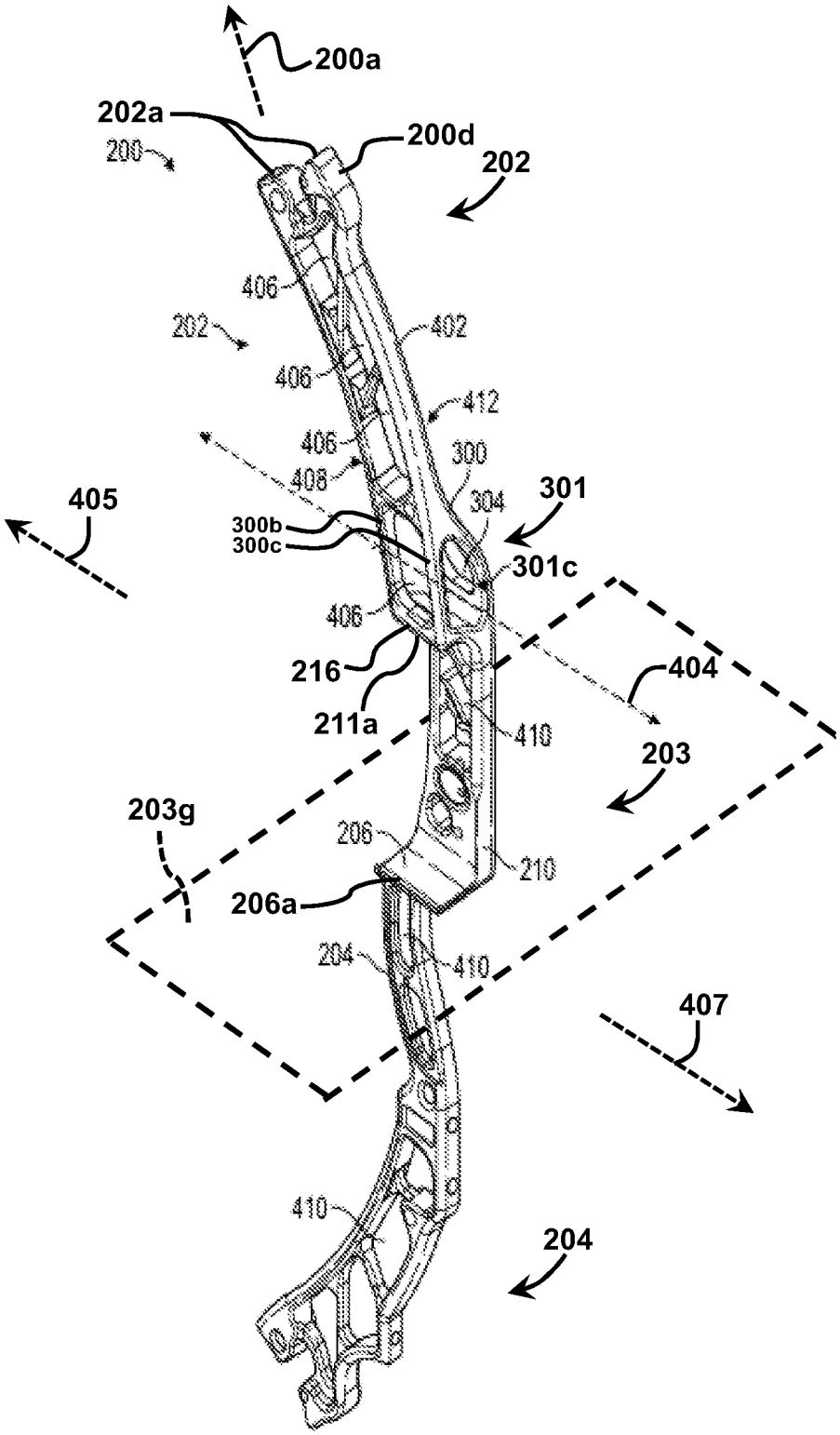
FIG. 4
AMENDED

ARCHERY BOW ASSEMBLY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of, and claims the benefit and priority of, U.S. patent application Ser. No. 15/163,291, filed May 24, 2016, which is a continuation of, and claims the benefit and priority of, U.S. patent application Ser. No. 14/492,396, filed on Sep. 22, 2014, which is a non-provisional of, and claims the benefit and priority of, U.S. Provisional Patent Application No. 61/880,303, filed on Sep. 20, 2013. The entire contents of such applications are hereby incorporated by reference.

BACKGROUND OF THE INVENTION

The subject matter disclosed herein relates to archery bows and more particularly to risers for bows. Archery risers are the central portion of a bow that provide a means for attachment of other bow components such as limbs, grips, sights, etc. During a bow's draw cycle, the riser is placed under extreme stress which often produces riser deformation. Excessive deformation of the riser can hinder repeatability, accuracy, promote riser fatigue, decrease safety and negatively impact other parameters of the bow. An improved archery riser is therefore desirable. The discussion above is merely provided for general background information and is not intended to be used as an aid in determining the scope of the claimed subject matter.

BRIEF DESCRIPTION OF THE INVENTION

A riser for a bow is disclosed. The riser includes a top riser section that is joined to a middle riser section by a first and second step. The first and second steps strengthen the riser and permit the riser to be formed from less material while resisting undesirable deformation during use. An advantage that may be realized in the practice of some disclosed embodiments of the ability to produce a riser for a bow that uses less material than other risers while maintaining a riser that resists undesirable deformation.

In a first embodiment, a riser for a bow is provided. The riser comprises a top riser section joined to a middle riser section. The top riser section defines a first plane and the middle riser section defines a second plane. The first plane and the second plane are spaced from one another by a gap to provide an arrow shelf. The top riser section is joined to the middle riser section by both a first top step and a second top step. The first top step and the second top step join together at a first junction, separate from one another to form a cavity, then reunite at a second junction. The first junction is in the first plane and connects to the top riser section and the second junction is in the second plane and connects to the middle riser section.

In a second embodiment, a riser for a bow is provided. The riser comprises a top riser section joined to a bottom riser section by a middle riser section. The top riser section and the bottom riser section are aligned to define a first plane and the middle riser section defines a second plane. The first plane and the second plane are spaced from one another by a gap to provide an arrow shelf. The bottom riser section is joined to the middle riser section by a bottom step and the top riser section is joined to the middle riser section by both a first top step and a second top step. The first top step and the second top step join together at a first junction, separate from one another to form a cavity, then reunite at a second junction. The first junction is in the first plane and connects to the top riser section. The second junction being in the second plane and connects to the middle riser section.

In a third embodiment, a bow is provided. The bow comprises a riser comprising a top riser section joined to a bottom riser section by a middle riser section. The top riser section and the bottom riser section are aligned to define a first plane and the middle riser section defines a second plane. The first plane and the second plane are spaced from one another by a gap to provide an arrow shelf. The bottom riser section is joined to the middle riser section by a bottom step and the top riser section is joined to the middle riser section by both a first top step and a second top step. The first top step and the second top step join together at a first junction, separate from one another to form a cavity, then reunite at a second junction. The first junction is in the first plane and connects to the top riser section and the second junction is in the second plane and connects to the middle riser section. The bow further comprises a first bow limb removably attached to the top riser section and a second bow limb removably attached to the bottom riser section.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 2A, FIG. 2B and FIG. 2C are side, front and perspective views of another exemplary riser that includes a second step;

FIG. 3 is an expanded view of a section of the riser of FIG. 2B;

FIG. 4 is an expanded view of the riser of FIG. 2C;

DETAILED DESCRIPTION OF THE INVENTION

Figure 1A:
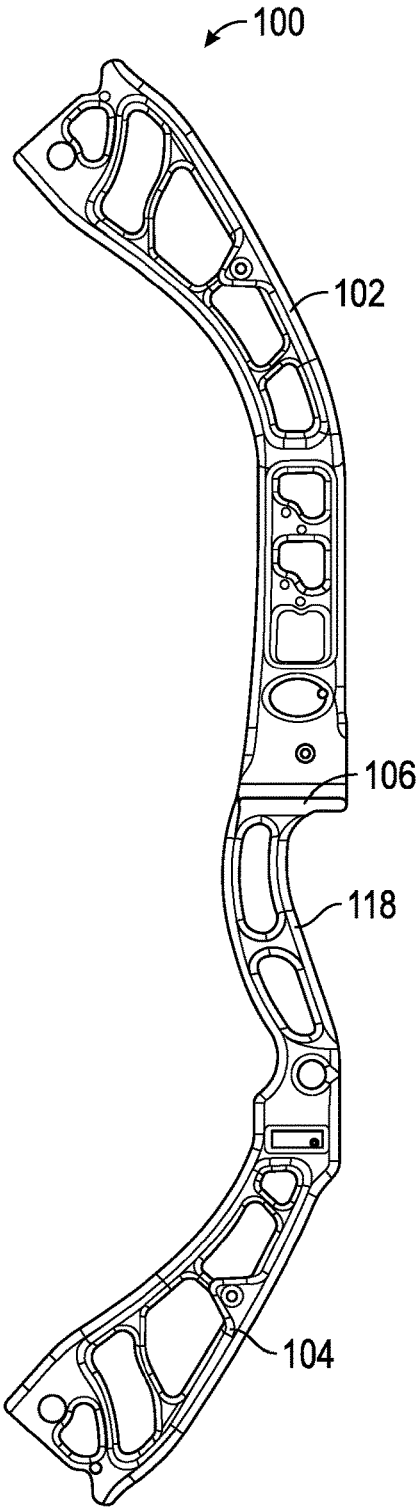
FIG. 1A, FIG. 1B and FIG. 1C are side, front and perspective views of an exemplary riser.
Figure 1B:
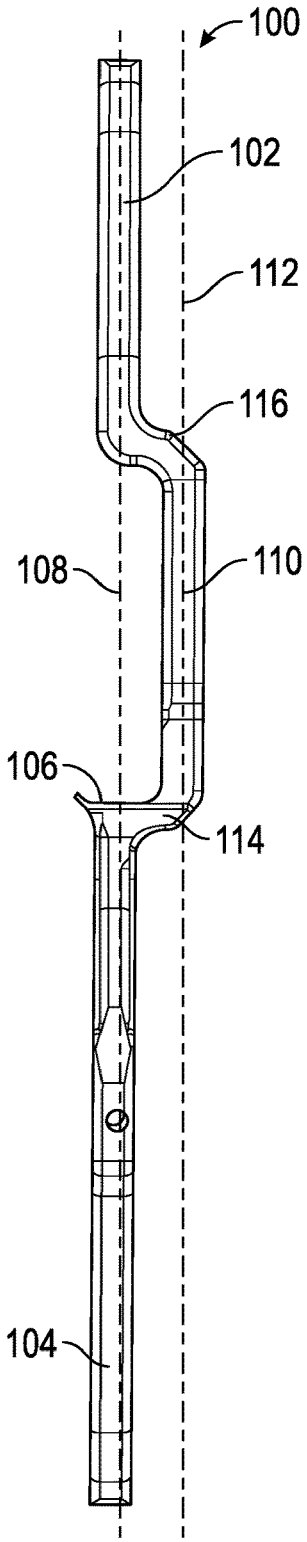
Figure 1C:
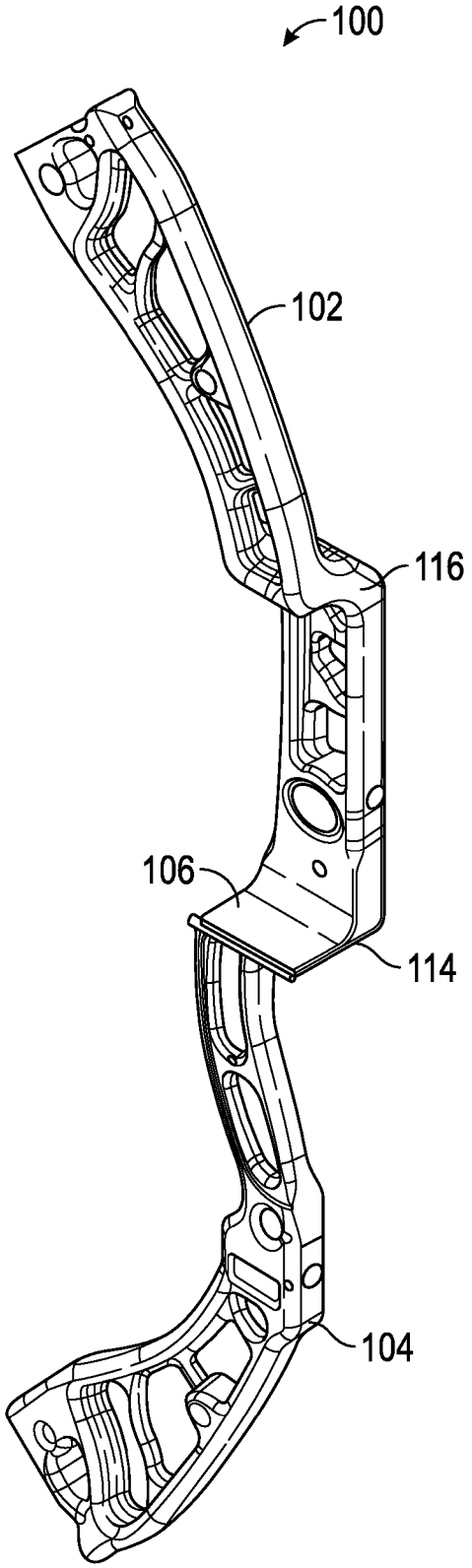

FIG. 1A, FIG. 1B and FIG. 1C depict a riser 100 that comprises a top riser section 102 and a bottom riser section 104. The top riser section 104 and the bottom riser section 104 define a first plane 108. Bow limbs (see FIG. 6) may be attached to the top riser section 102 and the bottom riser section 104, respectively. An arrow shelf 106 is provided by a middle riser section 110 that defines a second plane 112. The first plane 108 and the second plane 112 are separated by a gap. The middle riser section 110 joins with the bottom riser section 104 at a bottom step 114. The middle riser section 110 joins with the top riser section 102 at a top step 116. A handle 118 is provided below the arrow shelf 106 for an archery to grip the riser 100. During use, the top riser section 102 experiences stresses that causes undesirable deformations. To compensate for such deformations, the riser section 102 may be formed from strong, heavy materials. Unfortunately, this increases both the cost and the weight of the riser 100.

Figure 5:
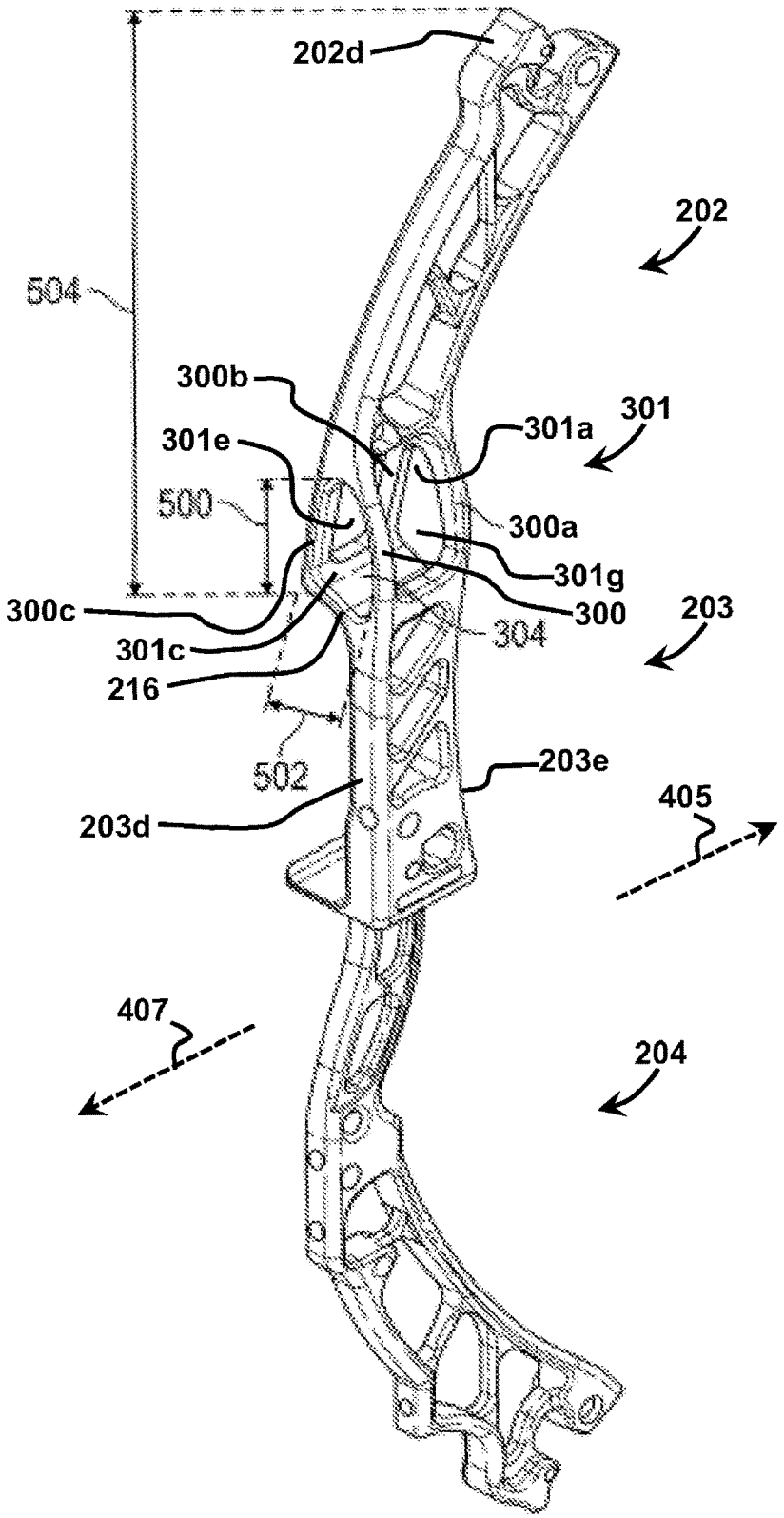
FIG. 5 is another view of the riser of FIG. 4.

FIG. 2A, FIG. 2B, and FIG. 2C, *FIG. 3, FIG. 4* and FIG. 5 depict a riser 200 that comprises a first section or top riser section 202, a second section 203 and a third section or bottom riser section 204. The first section or top riser section 202 has a plurality of first section sides 205a, 205b intersected by a lateral axis 207. The top riser section 204, 202 and the bottom riser section 204 define a first vertical plane or first plane 208. An arrow shelf 206, *extending in rightward and leftward directions and having an arrow shelf end 206a,* is provided by a middle riser section *or portion* 210 of the second section 203, *such portion 210 at least partially defining a space 210r*. The middle riser section *or portion* 210 [that] defines a second vertical plane or second plane 212. *The space 210r, extending along a lateral plane 203g, is accessible to an environment 203h. The middle riser portion 210 includes a middle riser segment 211 that extends upward to a segment end 211a, which is disconnected from the shelf end 206a, forming an entryway 203q that is accessible to an environment 203h.* The second section 203 has: a plurality of second section sides 203a, 203b; a second point 203c located centrally between the second section sides 203a, 203b; a second section back 203d (FIG. 5) *through which a second section back plane 203f passes* (*FIG. 2A*); and a second section front 203e (FIG. 6) *through which a second section front plane 203g passes* (*FIG. 2A*). The second section point 203c is located in the second plane 212. The first plane 208 and the second plane 212 are separated by a gap. The middle riser section 210 joins with the bottom riser section 204 at a bottom step 214. The middle riser section 110 joins with the top riser section 202 at a first frame member or first top step 216. A handle 218 (*extending along a longitudinal handle axis 218a*) is provided below the arrow shelf 206 for an archer to grip the riser 200. Unlike the riser 100, the riser 200 further comprises a second frame member or second top step 300. The configuration, structure or frame 301 shown in FIG. 2A, FIG. 2B, and FIG. 2C and FIGS. 3-6 improves riser strength by as much as 30% and reduces deformation by as much as 20% compared to a riser without such a second top step 300. Due to the increased strength provided by the second top step 300, the riser may be formed using less material. This reduces the weight and cost of the riser without negatively impacting its performance.

As shown in FIG. 3, the first frame member or first top step 216 and the second frame member or second top step 300 join at a first junction 302 where they both contact the top riser section 202. The first top step 216 and the second top step 300 separate to form an inner space or a cavity 304 and then reunite at a second junction 306 where they both contact the middle riser section 210. The cavity 304 and the second top step 300 provide additional strength to the riser 200 while minimizing the amount of material used. This results in a reduction in weight and manufacturing costs. The first junction 302 is in the first plane 208 while the second junction 306 is in the second plane 212. The first top step 216 is disposed below the second top step 300. As illustrated in FIG. 5, frame members 216, 300, 300a, 300b and 300c of frame 301 define: the inner space or cavity 304 (FIG. 3); front opening 301a extending in front plane 301b (FIG. 6); back opening 301c extending in back plane 301d (FIG. 6); first side opening 301e extending in first side plane 301f (FIG. 3); second side opening 301g extending in second side plane 301h (FIG. 3); and a frame point 301i centrally located between a point on the first side plane 301f and a point on the second side plane 301h.

Figure 6:
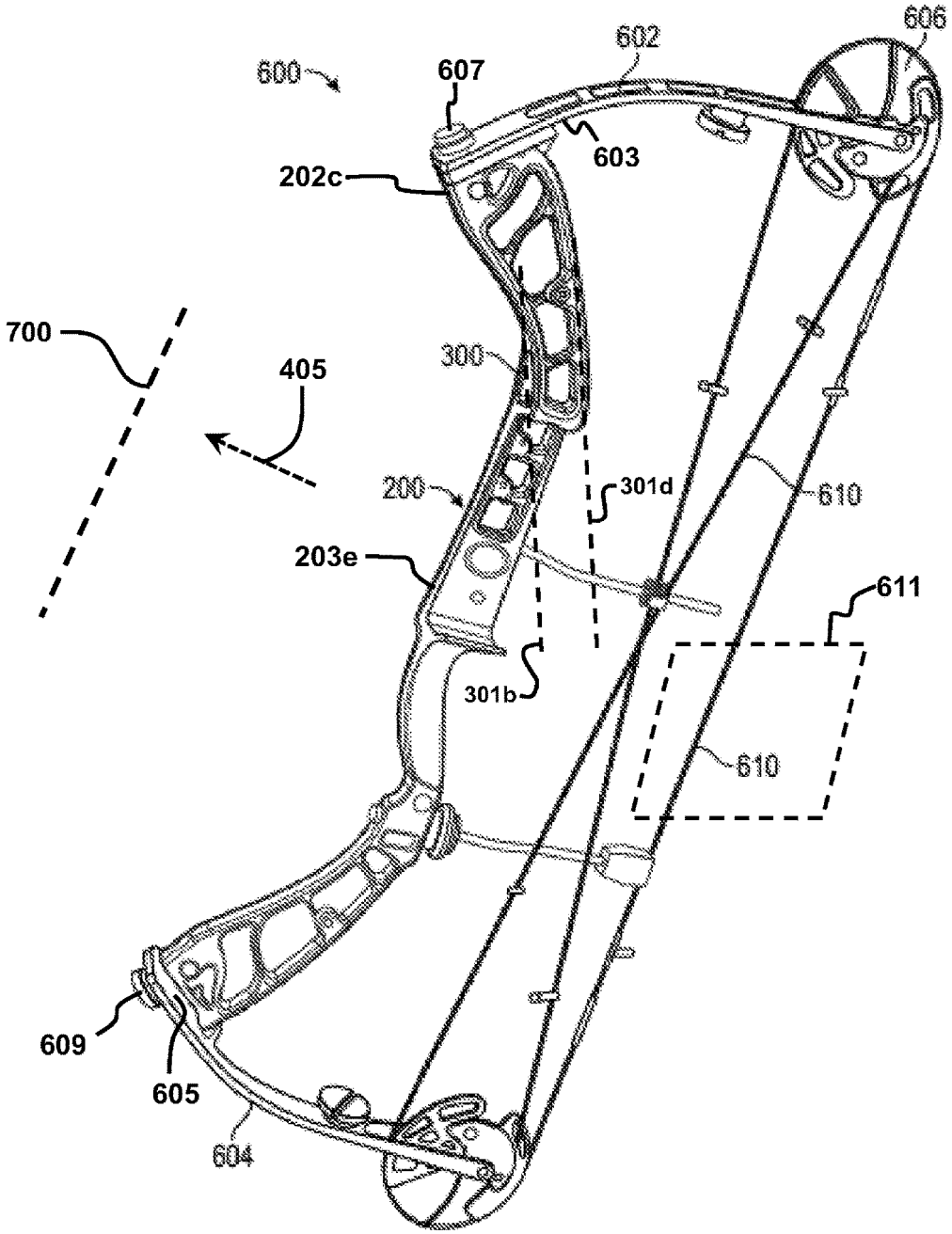
FIG. 6 is a view of an exemplary bow that uses the riser of FIG. 4.

As shown in FIGS. 4-6, the cavity 304 comprises a forward-facing opening or front opening 301a [402] (facing in a forward direction 405) and a backward-facing or back opening 301c [404 that define a] (*facing in a rearward direction 407), wherein the directions 405, 407 extend along a* direction 404 that is parallel to a plane defined by the arrow shelf 206. The first section or top riser section 202 *or 402, respectively,* comprises: a limb mount surface 202a (facing in a riser direction 200a); a mount surface point 202b (FIG. 2B) located centrally between the first section sides 205a, 205b (*which are spaced apart by a first dimension 501, as shown in FIG. 3*); a first section front 202c (FIG. 6) configured to face in the forward direction 405 when the riser 200 is aimed at a shooting target 700 (FIG. 6); a first section back 202d configured to face in the backward direction 407 when the riser 200 is aimed at the shooting target 700 (FIG. 6); and a plurality of holes 406 that extend from a first lateral side 408 to a second lateral side 412. The plurality of holes 406 are perpendicular to the forward-facing or front opening [402] 301a and the backward-facing or back opening [404] 301c. The presence of the plurality of holes 406 permits the riser 200 to be formed using less materials, thereby reducing the weight and cost of the riser 200. The presence of the shoulder or second top step 300 increases the strength of the riser 200 to minimize undesired deformation. Additional holes 410 in the lower riser section 204 and the middle riser section 210 further reduce the weight and cost of the riser 200. In the embodiment of FIG. 4, the cavity 304 comprises four openings: the forward-facing or front opening [402] 301a, the backward-facing or back opening [404] 301c, and two side openings 301e, 301g facing the lateral sides 408, 412, respectively. In another embodiment, not shown, the cavity 304 comprises at least one lateral facing opening and the forward-facing and backward-facing sides are solid plates.

As shown in FIG. 5, the cavity 304 has a length 500 and a *second dimension or* width 502. In one embodiment, the length 500 is at least about 10% of an overall length 504 of the top riser section 202. In another embodiment, the length 500 is at least about 15% of the overall length 504. In another embodiment, the length 500 is at least about 20% of the overall length 504. In yet another embodiment, the length 500 is about 25% of the over length 504. The width 502 is less than the length 500. In one embodiment, the width is about 50% of the length 500.

FIG. 6 depicts a compound bow 600 that comprises the riser 200, a first bow limb 602 (having a riser engagement surface 603), and a second bow limb 604 (having a riser engagement surface 605), and a plurality of fasteners 607 and 609 that couple the limbs 602 and 604, respectively, to the riser 200. A first cam 606 and a second cam 608 are attached to the first bow limb 602 and the second bow limb 604, respectively. Bowstrings 610, configured to be drawn backward in bowstring plane 611, are stretched between the first cam 606 and the second cam 608. When the bowstrings 610 are actuated, the first bow limb 602 and the second bow limb 604 bend and apply a strain to the riser 200. The second top step 300 (see FIG. 3) minimizes the deformation in the riser 200 caused by the strain. The presence of cams in the compound 600 permits a bowstring to be drawn with high force which results in significant strain on the riser 200. Accordingly, the riser 200 is particularly useful with compound bows.

In one embodiment, the riser is monolithic such that the top riser section, the bottom riser section and the middle riser section are formed as a single piece. The riser may be formed from a lightweight material, such as aluminum.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The following is claimed:

1. An archery bow [riser] *assembly* comprising:

*a first flexible limb;* a first section *supporting the first flexible limb, the first section* comprising:

a first section front configured to at least partially face in a forward direction toward a shooting target when the [archery bow riser] *first section* is aimed at the shooting target;

a first section back configured to at least partially face in a backward direction away from the shooting target when the [archery bow riser] *first section* is aimed at the shooting target;

a plurality of first section sides [positioned] *spaced* apart from each other[, wherein a lateral axis extends between the first section sides and intersects with the first section sides] *by a first dimension*;

[a limb mount surface comprising a mount surface point located centrally between the first section sides, the mount surface point being located in a first vertical plane when the archery bow riser is vertically positioned, wherein the lateral axis intersects with the first vertical plane;]

a frame connected to the first section[;], wherein the frame comprises a plurality of frame members [arranged to define:], *wherein the frame at least partially bounds an interior cavity, wherein the plurality of the frame members are spaced apart from each other by a second dimension that is greater than the first dimension;*

[a first frame opening extending in a first frame plane, wherein the lateral axis intersects with the first frame plane;

a second frame opening extending in a second frame plane, wherein the lateral axis intersects with the second frame plane;

a third frame opening extending in a third frame plane, wherein the forward direction intersects with the third frame plane; and a fourth frame opening extending in a fourth frame plane, wherein the backward direction intersects with the fourth frame plane;

wherein the frame comprises a frame point located centrally between the first and second frame planes;

wherein the first frame plane, the second frame plane, the third frame plane and the fourth frame plane surround an inner space; and]

a second section connected to the frame, wherein the second section comprises:

[a second section front configured to face in the forward direction when the archery bow riser is aimed at the shooting target;

a second section back configured to face in the backward direction when the archery bow riser is aimed at the shooting target;

a plurality of second section sides spaced apart from each other; and a second section point located centrally between the second section sides, wherein the second section point is located in a second vertical plane when the archery bow riser is vertically positioned, wherein the second vertical plane is offset from the frame point, wherein the second vertical plane is offset from the first vertical plane; and]

*a second section front configured to at least partially face in the forward direction when the second section is aimed at the shooting target;*

*a second section back configured to at least partially face in the backward direction when the second section is aimed at the shooting target;*

*a second section right side configured to at least partially face in a rightward direction when the second section is aimed at the shooting target;*

*a second section left side configured to at least partially face in a leftward direction when the second section is aimed at the shooting target; and*

*a portion that at least partially defines a space, wherein the portion comprises:*

*(a) an arrow shelf comprising a shelf end, wherein the arrow shelf extends in one of the rightward or leftward directions to the shelf end; and*

*(b) a segment connected to the arrow shelf,*

*wherein the segment comprises a segment end,*

*wherein, when the archery bow assembly is vertically oriented, the segment extends upward from the arrow shelf to the segment end,*

*wherein at least part of the segment is configured to face in one of the rightward or leftward directions,*

*wherein the shelf end and the segment end are disconnected from each other to form an entryway configured to at least partially receive a shaft of an arrow so that, when the arrow is oriented to be aimed at the*

*target, the arrow is movable in one of the rightward or leftward directions from an environment into the space; and* a third section connected to the second section, wherein the third section comprises a handle *that at least partially extends along a longitudinal handle axis, wherein the longitudinal handle axis remains extended along a bowstring plane that faces in one of the rightward or leftward directions.*

2. The archery bow [riser] *assembly* of claim 1, wherein:

the first section comprises a top riser section;

the second section comprises a middle riser section; [and]

the third section comprises a bottom riser section *extending from the handle;*

*the archery bow assembly comprises a second flexible limb supported by the bottom riser section; and*

*the first section, the second section, and the third section are formed as a single piece.*

3. The archery bow [riser] *assembly* of claim [1] *2*, wherein [the frame members comprise a first top step and a second top step]*:*

*the top riser section comprises a first limb mount surface that is configured to be engaged with the first flexible limb;*

*the first flexible limb is configured to support a bowstring;*

*the archery bow assembly comprises a second flexible limb;*

*the third section comprises a second limb mount surface that is configured to be engaged with the second flexible limb;*

*the second flexible limb is configured to support the bowstring; and*

*when the bowstring is retracted backward, the bowstring is configured to:*

*apply a first force to the first limb mount surface, wherein the first force is transmitted through the frame members and then to the handle through one of a direct transmission path or an indirect transmission path; and apply a second force to the second limb mount surface, wherein the second force is transmitted to the handle through one of a direct transmission path or an indirect transmission path.*

4. The archery bow [riser] *assembly* of claim 1, wherein [the third section comprises a bottom step extending to the second section, wherein the bottom step comprises an arrow shelf]*:*

(*a*) *the segment and the arrow shelf are integral with the portion of the second section;*

(*b*) *the arrow shelf is configured to be positioned below, and spaced apart from, the arrow when the arrow is aimed at the target;*

(*c*) *the third section is integral with the second section; and*

(*d*) *the handle is one of integral with or fixedly connected to the third section.*

5. The archery bow [riser] *assembly* of claim 1, [wherein, when the archery bow riser is positioned vertically, at least one of the first and second frame planes intersects with the first vertical plane] *comprising:*

*a second flexible limb supported by the third section;*

*a bowstring supported by the first and second flexible limbs, wherein a portion of the bowstring is configured to move in the forward direction toward the shooting target,*

*wherein the bowstring plane extends through the portion of the bowstring during a movement of the portion of the bowstring.*

6. The archery bow [riser] *assembly* of claim 1, wherein, when the archery bow [riser] *assembly* is positioned vertically[, at least one of the first and second frame planes is parallel with the first vertical plane]*:*

*the first section at least partially extends along a vertical plane;*

*the first dimension is measurable along a first lateral axis that intersects the vertical plane; and*

*the second dimension is measurable along a second lateral axis that intersects the vertical plane.*

7. The archery bow [riser] *assembly* of claim 1, [wherein the frame is configured to have a strengthening effect on the first section while the inner space has a weight reduction effect on the first section] *comprising a cam supported by the first flexible limb, wherein the first flexible limb is configured to be flexed between a plurality of positions relative to the first section, wherein the flexing of the first flexible limb causes the cam to move relative to the first section.*

8. The archery bow [riser] *assembly* of claim 1, wherein:

[the limb mount surface comprises a first limb mount surface that is configured to be engaged with a first flexible limb;

the first flexible limb is configured to be coupled to a bowstring;

the third section comprises a second limb mount surface that is configured to be engaged with a second flexible limb;

the second flexible limb is configured to be coupled to the bowstring; and when the bowstring is retracted backward, the bowstring is configured to:

apply a first force to the first limb mount surface, wherein the first force is transmitted through the mount surface point, through the frame members and then to the handle; and apply a second force to the second limb mount surface, wherein the second force is directly or indirectly transmitted to the handle]

*the frame is configured to have a strengthening effect on the first section while the interior cavity has a weight reduction effect on the first section; and*

*the portion of the second section at least partially comprises a C shape that comprises an open mouth at least partially facing in one of the rightward or leftward directions when the second section is aimed at the shooting target.*

9. An archery bow [riser comprising] *assembly of claim 1, wherein*:

[a first section configured to be coupled to a limb, wherein the limb is configured to be coupled to a bowstring, wherein the bowstring is configured to be drawn in a backward direction, and wherein a segment of the bowstring is configured to travel in a forward direction within a bowstring plane after the bowstring is released, wherein the first section comprises:

a first section front configured to face in the forward direction;

a first section back configured to face in the backward direction;

a plurality of first section sides positioned apart from each other, wherein a lateral axis extends between the first section sides and intersects with the bowstring plane; and a limb mount surface comprising a mount surface point located midway between the first section sides;

a frame connected to the first section;

wherein the frame comprises a plurality of frame members arranged to define:

a first frame opening extending along a first frame plane, wherein the lateral axis intersects with the first frame plane;

a second frame opening extending along a second frame plane, wherein the lateral axis intersects with the second frame plane;

a front opening extending along a third frame plane, wherein the forward direction intersects with the third frame plane; and a back opening extending along a fourth frame plane, wherein the backward direction intersects with the fourth frame plane, wherein the first frame plane, the second frame plane, the third frame plane and the fourth frame plane surround an inner space, wherein the frame comprises a frame point within the inner space, wherein the frame point is located midway between the first and second frame planes, wherein the frame point is located within a frame point plane, wherein the lateral axis intersects with the frame point plane, wherein the frame point plane is located apart from the mount surface point; and a second section connected to the frame]

*the second section comprises a configuration associated with a level of support for the first section; and*

*the frame is configured to provide an additional level of support for the first section.*

10. The archery bow [riser of claim 9, wherein the second section comprises] *assembly comprising*:

[a second section front configured to face in the forward direction;

a second section back configured to face in the backward direction;

a plurality of second section sides spaced apart from each other; and a second section point located centrally between the second section sides, wherein the second section point is located in a second section point plane, wherein the lateral axis intersects with the second section point plane, wherein the second section point plane is located apart from the mount surface point, wherein the second section point plane is located apart from the frame point]

*a first flexible limb;*

*a first section supporting the first flexible limb, wherein the first flexible limb is configured to support a bowstring, wherein the first flexible limb is configured to be flexed relative to the first section, wherein the bowstring is configured to be drawn in a backward direction, and wherein a segment of the bowstring is configured to travel in a forward direction along a bowstring plane after the bowstring is released, wherein the first section comprises:*

*a first section front configured to face in the forward direction;*

*a first section back configured to face in the backward direction; and*

*a plurality of first section sides spaced apart from each other by a first dimension;*

*a frame connected to the first section, wherein the frame comprises a plurality of frame members spaced apart from each other by a second dimension, wherein the second dimension is greater than the first dimension, wherein the frame at least partially surrounds an interior cavity;*

*a second section connected to the frame, wherein the second section comprises:*

*a second section front configured to at least partially face in the forward direction;*

*a second section back configured to at least partially face in the backward direction;*

*a second section right side configured to at least partially face in a rightward direction;*

*a second section left side configured to at least partially face in a leftward direction; and*

*a portion that at least partially defines a space, wherein the portion comprises:*

*(a) an arrow shelf; and*

*(b) at least one segment connected to the arrow shelf, wherein at least part of the at least one segment is configured to face in one of the rightward or leftward directions,*

*wherein the arrow shelf and the at least one segment form an entryway configured to at least partially receive a shaft of an arrow so that, when the arrow is oriented to be aimed in the forward direction, the arrow is movable in one of the rightward or leftward directions from an environment into the space; and*

*a structure comprising a handle shape,*

*wherein the first section, the frame, the second section and the structure are collectively formed as a single piece.*

11. The archery bow [riser] *assembly* of claim 10, wherein [the second section point plane is parallel to the bowstring plane] *the structure at least partially extends along the bowstring plane.*

12. The archery bow [riser] *assembly* of claim [10] *11*, comprising a third section connected to the second section, wherein the third section comprises *the structure, wherein the structure comprises* a handle.

13. The archery bow [riser] *assembly* of claim 12, wherein[:]*, when the archery bow assembly is aimed in the forward direction, the arrow shelf provides a lower boundary of the space*

[the first section comprises a top riser section;

the second section comprises a middle riser section;

the third section comprises a bottom riser section;

the bottom riser section comprises a bottom step extending to the second section;

the bottom step comprises an arrow shelf; and the frame members comprise a first top step and a second top step].

14. The archery bow [riser] *assembly* of claim [12] *10*, wherein:

[the limb comprises a first flexible limb;

the limb mount surface comprises a first limb mount surface that is configured to be engaged with the first flexible limb;

the first flexible limb is configured to be coupled to the bowstring;

the third section comprises a second limb mount surface that is configured to be engaged with a second flexible limb;

the second flexible limb is configured to be coupled to the bowstring;

when the bowstring is drawn backward, the bowstring is configured to:

apply a first force to the first limb mount surface, wherein the first force is transmitted through the mount surface point, through the frame members and then to the handle;

apply a second force to the second limb mount surface, wherein the second force is directly or indirectly transmitted to the handle; and the frame is configured to have a strengthening effect on the first section while the inner space has a weight reduction effect on the first section] (*a*) *the arrow shelf and the at least one segment are integral with the portion of the second section; and* (*b*) *the arrow shelf is configured to be positioned below, and spaced apart from, the arrow when the arrow is aimed in the forward direction.*

15. The archery bow [riser] *assembly* of claim [9] *10*, wherein [at least one of the first and second frame planes intersects with the bowstring plane]*:*

*the archery bow assembly comprises a second flexible limb;*

*the first flexible limb supports a first cam;*

*the second flexible limb supports a second cam;*

*the first and second flexible limbs are configured so that when the bowstring is drawn backward, the first and second cams move closer together; and*

*the frame is configured to have a strengthening effect on the first section while the interior cavity has a weight reduction effect on the first section.*

16. The archery bow [riser] *assembly* of claim [9] *10*, wherein [at least one of the first and second frame planes is parallel with the bowstring plane] *the frame members define a plurality of openings that provide access to the interior cavity.*

17. An archery bow [riser comprising] *assembly of claim 16, wherein*:

[a first section configured to be coupled to a flexible limb of an archery bow, wherein the flexible limb is configured to be coupled to a bowstring of the archery bow, wherein the bowstring is configured to be drawn in a backward direction causing the flexible limb to flex, wherein the bowstring comprises a bowstring segment comprising a length, wherein the bowstring segment is configured to travel in a forward direction within a bowstring plane after the bowstring is released, wherein the first section comprises:

a first section front configured to face in the forward direction;

a first section back configured to face in the backward direction;

a plurality of first section sides positioned apart from each other, wherein a lateral axis extends between the first section sides and intersects with the bowstring plane; and a limb mount surface comprising a mount surface point located midway between the first section sides;

a framework connected to the first section, wherein the framework comprises a plurality of frame members arranged to define:

a first frame opening extending along a first frame plane, wherein the lateral axis intersects with the first frame plane;

a second frame opening located opposite of the first frame opening, wherein the second frame opening extends along a second frame plane, wherein the lateral axis intersects with the second frame plane;

a third frame opening extending along a third frame plane, wherein the forward direction intersects with the third frame plane; and a fourth frame opening located opposite of the third frame opening, wherein the fourth frame opening extends along a fourth frame plane, wherein the backward direction intersects with the fourth frame plane, wherein the first frame plane, the second frame plane, the third frame plane and the fourth frame plane surround an inner space, wherein the framework comprises a frame point within the inner space, wherein the frame point is located midway between the first and second frame planes, wherein the frame point is located within a frame point plane, wherein the lateral axis intersects with the frame point plane, wherein the frame point plane is offset from the mount surface point; and a second section extending from the framework, wherein the second section comprises:

a plurality of second section sides located opposite of each other, wherein the second section sides intersect with the lateral axis; and a second section point located midway between the second section sides, wherein the second section comprises a configuration so that the second section point is offset from the bowstring plane so as to enable the bowstring to launch an arrow in the forward direction without interfering with the second section, wherein the configuration of the second section is associated with a level of support for the first section, wherein the framework is configured to provide an additional level of support for the first section]

*each of the openings extends along a plane; and*

*the interior cavity is surrounded by a combination of the frame members and the planes.*

18. The archery bow [riser] *assembly* of claim [17] *10*, wherein [the inner space and the first, second, third and fourth frame openings of the framework are configured to reduce a magnitude of weight added to the archery bow riser by the framework]*:*

*the second section comprises a configuration associated with a level of support for the first section; and*

*the frame is configured to provide an additional level of support for the first section.*

19. The archery bow [riser of claim 17, wherein the second section defines at least part of a U-shape, wherein the archery bow riser comprises a third section extending from the second section, wherein the third section comprises a handle] *assembly comprising:*

*a first flexible limb;*

*a first section supporting the first flexible limb, wherein the first flexible limb is configured to support a bowstring, wherein the bowstring is configured to be drawn in a backward direction causing the first flexible limb to flex relative to the first section, wherein the bowstring comprises a bowstring segment comprising a length, wherein the bowstring segment is configured to travel in a forward direction along a bowstring plane after the bowstring is released, wherein the first section comprises:*

*a first section front configured to face in the forward direction;*

*a first section back configured to face in the backward direction;*

*a plurality of first section sides positioned apart from each other by a first dimension; and*

*a framework connected to the first section, wherein the framework comprises a plurality of frame members spaced apart from each other by a second dimension, wherein the second dimension is greater than the first dimension, wherein the framework*

*at least partially surrounds a first space;*

*a second section connected to the framework, wherein the second section comprises:*

*a second section front configured to at least partially face in the forward direction;*

*a second section back configured to at least partially face in the backward direction;*

*a second section right side configured to at least partially face in a rightward direction;*

*a second section left side configured to at least partially face in a leftward direction; and*

*a portion that at least partially surrounds a second space, wherein the portion comprises:*

(*a*) *an arrow shelf; and*

(*b*) *at least one segment connected to the arrow shelf,*

*wherein the at least one segment is configured to face in one of the rightward or leftward directions,*

*wherein the at least one segment comprises a segment end,*

*wherein, when the archery bow assembly is vertically oriented, the at least one segment extends upward from the arrow shelf to the segment end,*

*wherein at least part of the at least one segment is configured to face in one of the rightward or leftward directions,*

*wherein the shelf end and the segment end are disconnected from each other,*

*wherein the arrow shelf and the at least one segment form an entryway configured to at least partially receive an arrow so that, when the arrow is aimed in the forward direction, the arrow is movable in one of the rightward or leftward directions from an environment into the second space; and*

*a handle that is immovably connected to the second section.*

20. An archery bow [comprising the archery bow riser] *assembly* of claim 19, wherein[the archery bow comprises the flexible limb and the bowstring]:

*the second section comprises a configuration associated with a level of support for the first section; and*

*the framework is configured to provide an additional level of support for the first section.*

*21. The archery bow assembly of claim 19, wherein:*

*the archery bow assembly comprises a third section connected to the second section, wherein the third section comprises the handle; and*

*the first section, the framework, the second section, and the third section are formed as a single piece.*

*22. An archery bow comprising the archery bow assembly of claim 19, wherein:*

*the second space comprises an arrow receiving space that extends in a lateral direction into the environment;*

*the lateral direction intersects with the bowstring plane; and*

*the portion of the second section at least partially comprises a C shape that comprises an open mouth at least partially facing in one of the rightward or leftward directions when the second section is aimed in the forward direction.*

*23. The archery bow assembly of claim 19, comprising:*

*a second flexible limb supported by the second section;*

*a first cam supported by the first flexible limb; and*

*a second cam supported by the second flexible limb,*

*wherein the first and second flexible limbs are configured so that, when the bowstring is drawn backward, the first cam and the second cam move closer together.*

*24. The archery bow assembly of claim 19, wherein:*

*the frame members define a plurality of openings that provide access to the first space;*

*each of the openings extends along a plane; and*

*the first space is surrounded by a combination of the frame members and the planes.*

* * * * *